US006810258B1

(12) United States Patent
Vialen (10) Patent No.: US 6,810,258 B1
(45) Date of Patent: Oct. 26, 2004

(54) CONTENTION RESOLUTION METHOD IN CHANNEL ALLOCATION

(75) Inventor: Jukka Vialen, Espoo (FI)

(73) Assignee: Nokia Corporation, Espoo (FI)

( * ) Notice: Subject to any disclaimer, the term of this patent is extended or adjusted under 35 U.S.C. 154(b) by 819 days.

(21) Appl. No.: 09/606,635

(22) Filed: Jun. 29, 2000

Related U.S. Application Data

(63) Continuation of application No. PCT/FI99/00015, filed on Jan. 12, 1999.

(30) Foreign Application Priority Data

Jan. 14, 1998 (FI) .................................................. 980063

(51) Int. Cl.[7] ............................ H04B 7/00; H04Q 7/20; H04M 3/16
(52) U.S. Cl. ........................ 455/450; 455/411; 455/509; 370/322; 370/337; 370/348
(58) Field of Search ................................ 455/509, 515, 455/450, 451, 452, 411, 512; 370/322, 348, 443, 329, 337

(56) References Cited

U.S. PATENT DOCUMENTS

| 4,866,788 | A | | 9/1989 | Mouly et al. | |
|---|---|---|---|---|---|
| 4,907,224 | A | * | 3/1990 | Scoles et al. | 370/443 |
| 5,440,758 | A | | 8/1995 | Grube et al. | |
| 5,502,721 | A | | 3/1996 | Pohjakallio | |
| 6,031,832 | A | * | 2/2000 | Turina | 370/348 |
| 6,084,869 | A | * | 7/2000 | Fishman et al. | 370/348 |
| 6,240,083 | B1 | * | 5/2001 | Wright et al. | 370/348 |

OTHER PUBLICATIONS

International Search Report for PCT/FI99/00015.

* cited by examiner

*Primary Examiner*—Simon Nguyen
(74) *Attorney, Agent, or Firm*—Squire, Sanders & Dempsey L.L.P.

(57) ABSTRACT

The invention relates to a method of performing contention resolution for dedicated channel reservation of a cellular radio network air interface (170), a network part (128) of the cellular radio network, and a subscriber terminal (150) of the cellular radio network. (404) The network part (128) captures a random access request message (acc_req) transmitted on a random access channel by the subscriber terminal (150). (406) The network part (128) transmits an access grant message (acc_gra) on an access grant channel to the subscriber terminal (150). (408, 410) At least one subscriber terminal (150) receives the access grant message (acc_gra) on the access grant channel and on the basis thereof assumes having reserved a dedicated channel. (412, 416) The network layer of at least one subscriber terminal (150) transmits on the dedicated channel a network layer service request message (d MS1), which contains the subscriber terminal (150) identifier, to the network layer of the network part. In accordance with the invention, the contention is resolved in such a way that (420) the radio network sublayer included in the network layer of the network part (128) transmits on the dedicated channel a response message (cont_res MS1), which contains the subscriber terminal (150) identifier to the radio network sublayer of the subscriber terminal (150). Thereafter, (422,424) the radio network sublayer of at least one subscriber terminal (150) compares the subscriber terminal (150) identifier included in the response message (cont_res MS1) received on the dedicated channel with its own identifier, and (422) if the identifiers are identical, it concludes that the channel reservation succeeded, and (424) if the identifiers are different, it concludes that the channel reservation failed.

15 Claims, 4 Drawing Sheets

CONTENTION RESOLUTION METHOD IN CHANNEL ALLOCATION

This is a continuation of Application Ser. No. PCT/FI99/00015, file Jan. 12, 1999.

FIELD OF THE INVENTION

The invention relates to a method of performing contention resolution for dedicated channel reservation of a cellular radio network air interface, which comprises: a network part and a radio connection from the network part to at least one subscriber terminal; the network part captures a random access request message transmitted on a random access channel by the subscriber terminal; the network part transmits an access grant message on an access grant channel to the subscriber terminal; at least one subscriber terminal receives the access grant message on the access grant channel and on the basis thereof assumes having reserved a dedicated channel; a network layer of at least one subscriber terminal transmits a network layer service request message, which contains the subscriber terminal identifier, on the dedicated channel to the network layer of the network part.

BACKGROUND OF THE INVENTION

In the above-described manner the subscriber terminal requests a dedicated control channel on common control channels. Signalling needed for connection establishment is completed on the dedicated channel, whereafter a transfer to an actual traffic channel will be performed.

The network part cannot know when the subscriber terminal is ready to start communicating, therefore the subscriber terminal's first message cannot be timed to avoid coincidence with the transmission of some other subscriber terminal.

The random access request message contains information on why the subscriber terminal wishes to establish the connection, and a random discriminator, but not an identifier to identify the subscriber terminal. In GSM system, for instance, the length of the random discriminator is only five bits. In UMTS (Universal Mobile Telephone System) system, the random discriminator is probably slightly longer.

Thus it is possible that at the same time instant two subscriber terminals transmit a random access request message with the same content. As result two things may occur in the network part: the first burst is received at a considerably higher power than the second and its content can thus be deoded, or, neither one can be received. The latter case is not problematic, a Slotted Aloha protocol is then used, according to which both subscriber terminals retransmit the random access request message in a random time.

The former case causes a problem which relates to the present invention. The network part transmits an access grant message, and two (or even more) subscriber terminals receive said message. If the data contained in the access grant message correspond to the content of the random access request message transmitted by the subscriber terminal, the subscriber terminal assumes having reserved a dedicated channel. This gives rise to a contention which subscriber terminal has succeeded in making the reservation. The problem is solved by a particular contention resolution procedure.

In GSM system the subscriber terminal transmits a data link layer SABM (Set Asynchronous Balanced Mode) frame containing a network layer service request message. The service request message contains the identifier of the subscriber terminal. The data link layer of the subscriber terminal stores the content of this frame to perform contention resolution. The network part returns the service request message in a data link layer UA (Unnumbered Acknowledgment) frame. The data link layer of the subscriber terminal compares the content of the UA frame information field, i.e. of the service request message, with the content of the stored message. If the contents are not identical, the subscriber terminal comes to a conclusion that its reservation failed. Then the subscriber terminal terminates its traffic on said dedicated channel and eventually restarts a new reservation operation for a dedicated channel. If the contents are identical, the subscriber terminal comes to a conclusion that the reservation succeeded and continues traffic on said dedicated channel.

The above-described arrangement can be used in GSM system. In new systems that are developed further from the basis of GSM system, for instance in UMTS (Universal Mobile Telephone System), the use of the described arrangement creates problems. When transferring protocols of the described GSM sublayers to UMTS, the contention resolution would be performed in an LLC (Logical Link Control) layer located in the data link layer to be described in greater detail later on in the text. The LLC sublayer can be used in the minimum mode to avoid peer-to-peer signalling between the network part and the subscriber terminal. Then the described arrangement does not work. Another problem with the known solution is that unnecessary data has to be transmitted over the air interface when the whole content of the network layer service request message is repeated in the UA frame, even though the mere identifier of the subscriber terminal would be sufficient.

BRIEF DESCRIPTION OF THE INVENTION

The object of the invention is to provide a method and an equipment for implementing the method to the effect that the above problems can be solved. This is achieved by a method of the type described in the preamble, which is characterized in that a radio network sublayer included in the network layer of the network part transmits on a dedicated channel a response message containing a subscriber terminal identifier to a radio network sublayer of the subscriber terminal; the radio network sublayer of at least one subscriber terminal compares the identifier received in the response message on the dedicated channel with its own identifier, and if the identifiers are identical, it comes to a conclusion that its dedicated channel reservation succeeded, and if the identifiers are different, that its dedicated channel reservation failed.

The invention further relates to a network part in a cellular radio network comprising protocol software which is arranged to capture a random access request message transmitted on the random access channel by the subscriber terminal, to transmit an access grant message on the access grant channel to the subscriber terminal, to receive a service request message containing the subscriber terminal identifier transmitted on the dedicated channel by at least one subscriber terminal network layer.

In accordance with the invention, the network part of the cellular radio network is characterized in that the protocol software is arranged to transmit a response message, which contains the subscriber terminal identifier, of the radio network sublayer included in the network layer on the-dedicated channel to the radio network sublayer.

The invention further relates to a subscriber terminal in a cellular radio network comprising protocol software, which is arranged to transmit a random access request message on a random access channel to a network part, to receive an access grant message on an access grant channel transmitted by the network part and to assume on the basis thereof that a dedicated channel is reserved, to transmit a network layer service request message containing a subscriber terminal identifier on the dedicated channel to the network layer of the network part.

In accordance with the invention, the subscriber terminal in the cellular radio network is characterized in that the protocol software is arranged to receive a response message containing the subscriber terminal identifier transmitted on the dedicated channel by the radio network sublayer included in the network part's network layer, to compare the subscriber terminal identifier in the response message received in the radio network sublayer with its own identifier, and to come to the conclusion that if the identifiers are identical, the reservation succeeded, and if the identifiers are different, the reservation failed.

The preferred embodiments of the invention are disclosed in dependent claims.

The invention is based on shifting the responsibility of the contention resolution procedure from the data link layer to the radio network sublayer of the network layer.

Several advantages are achieved with the method and arrangement of the invention. The solution enables current solutions in GSM to be flexibly transferred into UMTS. The structure of the response message is also made more sensible, whereby unnecessary data will not be repeated needlessly. Alternatively, the normal network layer message is used as a response message, whereby the transmission of an extra contention resolution message is avoided altogether.

BRIEF DESCRIPTION OF THE DRAWINGS

In the following the invention will be described in greater detail in connection with preferred embodiments, with reference to the attached drawings, wherein.

DETAILED DESCRIPTION OF THE INVENTION

Figure 1:
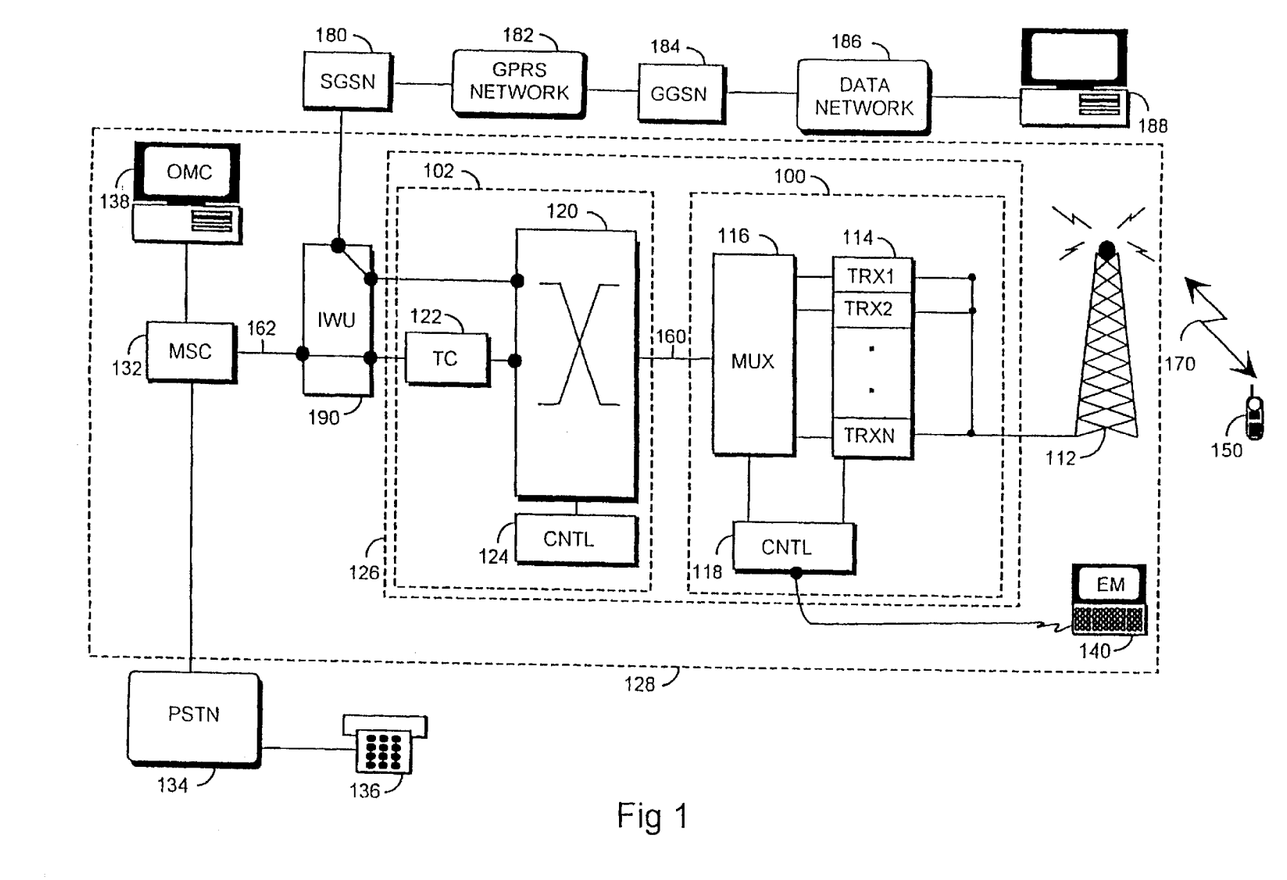
FIG. 1 illustrates an example of the structure of a cellular radio network.

With reference to FIG. 1, a typical structure of the cellular radio network in accordance with the invention will be described. FIG. 1 shows only sections that are relevant to the description of the invention, but it is obvious to one skilled in the art that a conventional cellular radio network also comprises other functions and structures whose description in greater detail is not necessary herein. The examples describe a cellular radio network using TDMA (Time Division Multiple Access), but the invention is not restricted thereto. The invention can be applied to GSM-based cellular radio networks, which refer to systems that are based at least partly on the GSM system specifications. One example is UMTS (Universal Mobile Telephone System).

The cellular radio network typically comprises a fixed network infrastructure, i.e. a network part 128 and subscriber terminals 150, which may be fixed terminals, terminals located in a vehicle, or portable, carry-around terminals. The network part 128 comprises base stations 100. A base station controller 102 communicating with the base stations controls a plurality of base stations 100 in a centralized manner. The base station 100 comprises transceivers 114. The base station 100 typically comprises one to sixteen transceivers 114. For instance, in TDMA radio systems one transceiver 114 provides radio capacity for one TDMA frame, that is, typically for eight time slots.

The base station 100 comprises a control unit 118, which controls the operation of the transceivers 114 and a multiplexer 116. With the multiplexer 116 the traffic and control channels used by a plurality of transceivers 114 are applied to one transmission link 160.

The transceivers 114 of the base station 100 have a connection to an antenna unit 112 which implements a bidirectional radio connection 170 with the subscriber terminal 150. In the bidirectional radio connection 170 the structure of the frames to be transmitted is accurately defined and it is called an air interface.

Figure 2:
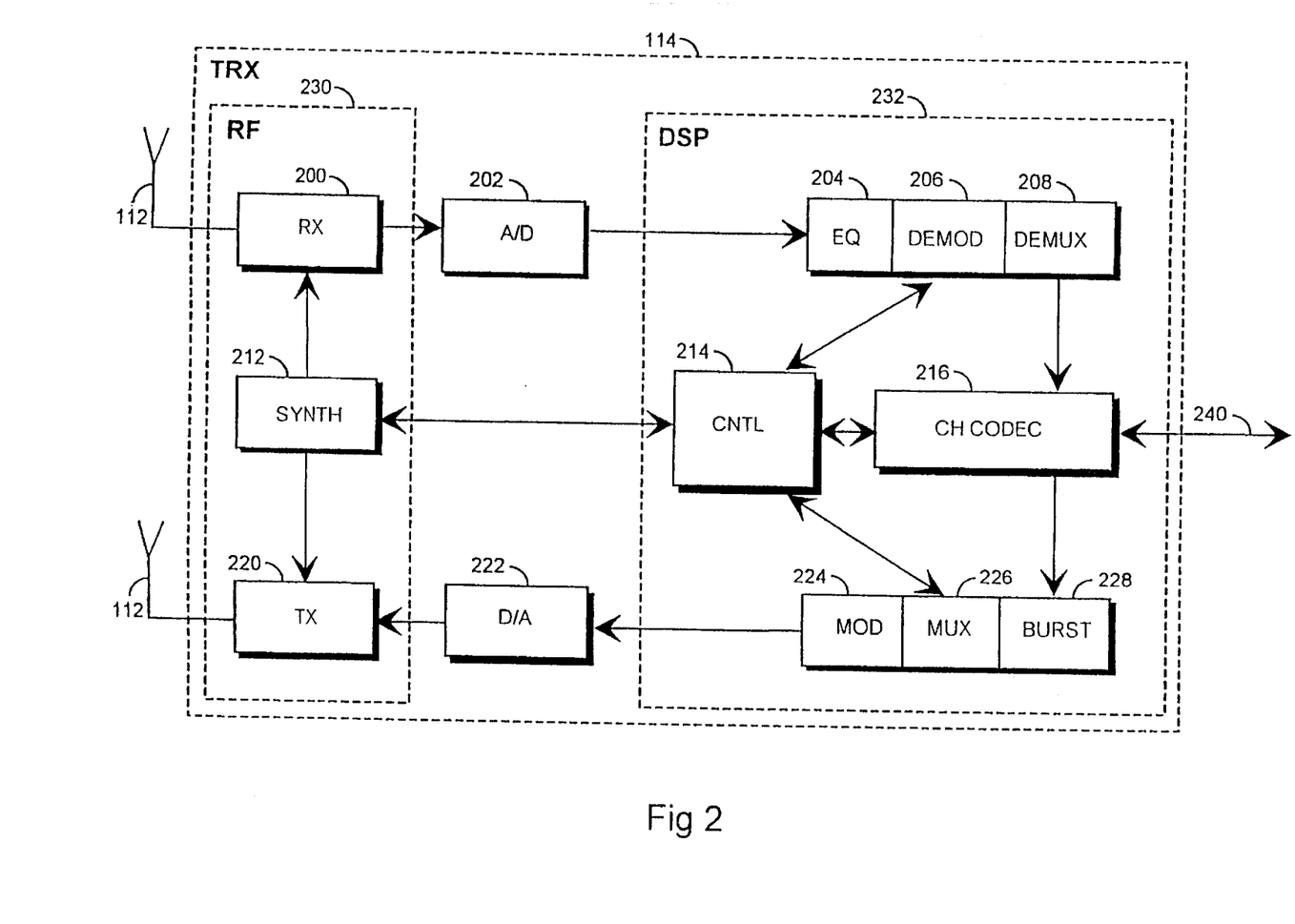
FIG. 2 illustrates the structure of a transceiver.

FIG. 2 illustrates in greater detail the structure of one transceiver 114. The receiver 200 comprises a filter, which eliminates frequencies outside the desired frequency band. Thereafter the signal is converted into an intermediate frequency or directly onto the baseband, in which form the signal is sampled and quantized in an analogue-to-digital converter 202. An equalizer 204 compensates for interference, for instance interference caused by multipath propagation. A demodulator 206 takes from the equalized signal the bit stream which is applied to a demultiplexer 208. The demultiplexer 208 separates the bit stream from different time slots into specific logical channels. A channel codec 216 decodes the bit stream of different logical channels, i.e. it decides whether the bit stream is signalling information to be applied to a control unit 214, or whether the bit stream is speech to be applied 240 to a speech codec 122 of the base station controller 102. The channel codec 216 also performs error correction. The control unit 214 performs internal control tasks by controlling various units. A burst former 228 adds a training sequence and tail bits to data coming out of the channel codec 216. A multiplexer 226 designates a time slot for each burst. A modulator 224 modulates digital signals onto a radio frequency carrier. This function is analogue in nature, so its performance requires a digital-to-analogue converter 222. A transmitter 220 comprises a filter, by which the bandwidth is limited. Moreover, the transmitter 220 controls the output power of the transmission. A synthesizer 212 arranges necessary frequencies for different units. A clock included in the synthesizer 212 may be locally controlled or it can be controlled in a centralized manner from somewhere else, for instance, from the base station controller 102. The synthesizer 212 generates the necessary frequencies, for instance, with a voltage-controlled oscillator.

The structure of the transceiver can be further divided in the manner described in FIG. 2 into radio frequency parts 230 and a digital signal-processing processor with software 232. The radio frequency parts 230 comprise the receiver 200, the transmitter 220 and the synthesizer 212. The digital signal-processing processor with software 232 comprise the equalizer 204, the demodulator 206, the demultiplexer 208, the channel codec 216, the control unit 214, the burst former 228, the multiplexer 226 and the modulator 224. The analogue-to-digital converter 202 is needed to convert the analogue radio signal into a digital signal, and correspondingly, the digital-to-analogue converter 222 is needed to convert the digital signal into an analogue signal.

The base station controller 102 comprises a group switching field 120 and a control unit 124. The group switching field 120 is used for speech and data switching and for connecting signalling circuits. A base station system 126 formed by the base station 100 and the base station controller 102 further comprises a transcoder 122. In general, the transcoder 122 is located as close as possible to a mobile services switching centre 132, since speech can then be transmitted between the transcoder 122 and the base station controller 102 in the cellular radio network format saving transmission capacity. In UMTS system the base station controller 102 can be called an RNC (Radio Network Controller).

The transcoder 122 converts the different digital coding formats of speech used between the public switched telephone network and the mobile telephone network to be mutually compatible, for instance, from the 64 kbits/s format of the fixed network into some other format (e.g. 13 kbits/s) of the cellular radio network and vice versa. The control unit 124 performs call control, mobility management, collecting of statistic data and signalling.

UMTS system employs an IWU 190 (Interworking Unit) to apply the base station system 126 to the second generation GSM mobile services switching centre 132 or to a support node 180 of the second generation packet switched network. In accordance with FIG. 1, a circuit switched connection can be established from the subscriber terminal 150 to a telephone 136 switched in the public switched telephone network (PSTN) through the mobile services switching centre 132. The cellular radio network may also employ a packet switched connection, for instance the packet switched data transmission of the GSM Phase 2+, i.e. GPRS (General Packet Radio Service). The support node 180 (SGSN= Serving GPRS Support Node) establishes the connection between the packet switched network 182 and the IWU 190. The support node's 180 task is to transmit packets between the base station system and the gateway node 184 (GGSN= Gateway GPRS Support Node) and to keep a record of the subscriber terminal's 150 location in the area.

The IWU 190 may be a physically separate device as in FIG. 1, or it can be integrated to be a part of the base station controller 102 or the mobile services switching centre 132. As appears from FIG. 1, when using the packet switched data transmission, data is not necessarily transmitted through the transcoder 122 between the IWU 190 and the group switching field 120, when the data to be transmitted is not allowed to be transcoded.

The gateway node 184 connects the public packet switched network 186 and the packet switched network 182. At the interface, an internet protocol or an X.25 protocol can be used. The gateway node 184 conceals by encapsulating the internal structure of the packet switched network 182 from the public packet switched network 186, and thus the packet switched network 182 appears to the public packet switched network 186 as a subnetwork, to the subscriber terminal 150 of which the public packet switched network may address packets and from which subscriber terminal it may receive packets.

The packet switched network 182 is typically a private network using an internet protocol, which network carries signalling and tunneled user data. The structure of the network 182 may vary operator-specifically concerning both the architecture and the protocols below the internet protocol layer.

The public packet switched network 186 may be, for instance, a global internet network with a communicating terminal 188, for instance, a server computer, wishing to transmit packets to the subscriber terminal 150.

The mobile services switching centre 132 communicates with an operations and maintenance centre (OMC), by means of which the operation of the radio telephone system is controlled and monitored. The operations and maintenance centre 132 is typically a relatively powerful computer with specific software. The control may also be applied to individual parts of the system, since control channels needed for control data transmission can be applied to the data transmission connections between the different parts of the system.

In addition, the personnel installing a network and controlling the operations may have at their disposal, for instance, a portable computer with management software 140 (EM=Element Manager) for the management of separate network elements. In the example of the figure, a device 140 is coupled to a data transmission port in the control unit 118 of the base station 100, thus enabling the operation of the base station 100 to be controlled and monitored therewith, for instance, by examining and changing the values of parameters regulating the operation of the base station.

The structure of the subscriber terminal 150 can be described utilizing the description of the transceiver 114 structure of FIG. 2. The components of the subscriber terminal 150 are operationally the same as those of the transceiver 114. The subscriber terminal 150 additionally comprises a duplex filter between the antenna 112 and the receiver 200 and the transmitter 220, user interface parts and a speech codec. The speech codec is connected to the channel codec via a bus 240.

Figure 3:
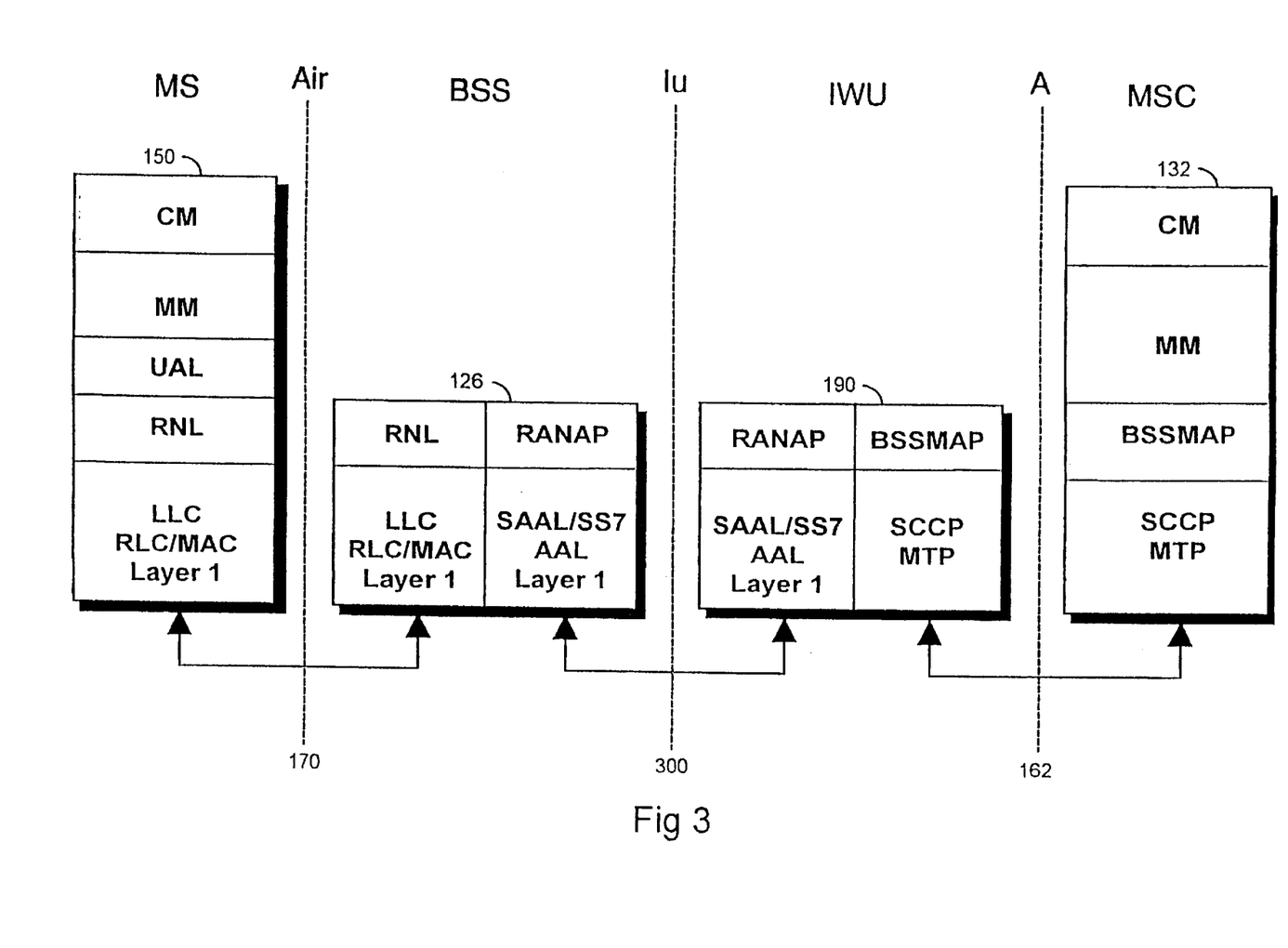
FIG. 3 illustrates protocol stacks of the cellular radio network.

Since the present invention relates to the processing of protocols used in the cellular radio network, an example of implementing necessary protocol stacks will be described next with reference to FIG. 3. In FIG. 3, the leftmost protocol stack is a protocol stack located in the subscriber terminal 150. The next protocol stack is in the base station system 126. The third protocol stack is in the IWU 190. The rightmost protocol stack is located in the mobile services switching centre 132. The air interface 170 implemented by the radio connection 170 between the subscriber terminal 150 and the base station system can also be referred to as an Um interface. The interface 162 between the base station system 126 and the mobile services switching centre 132 is called an A interface. Between the base station system 126 and the. IWU there is an Iu interface 300.

The protocol stacks are formed in accordance with the OSI (Open Systems Interconnection) model of the ISO (International Standardization Organization). In the OSI model, the protocol stacks are divided into layers. There can be seven layers. A layer in each device 150, 126, 190, 132 communicates logically with a layer in another device. Only the lowest, physical layers communicate directly with one another. Other layers always use services provided by the layer next below. A message must therefore physically travel vertically between the layers, and only in the lowest layer the message travels horizontally between the layers.

The actual bit level data transmission takes place through the lowermost (the first) physical layer, Layer 1. In the physical layer, mechanical, electric and operational characteristics are determined for connection to a physical transmission link. In GSM, the physical layer at the air interface 170 is implemented by means of TDMA technology.

The next (the second) layer, i.e. a data link layer, uses the services of the physical layer to provide reliable data transmission, which includes for instance, correction of transmission errors.

At the air interface 170 the data link layer divides into an RLC/MAC sublayer and an LLC sublayer. In the RLC/MAC (Radio Link Control/Medium Access Control) sublayer, the RLC part is responsible for segmenting and collecting data to be transmitted. In addition, the RLC part masks quality fluctuations in the radio connection 170 of the physical layer from the upper layers. The MAC part allocates and releases traffic channels for radio bearers. The LLC sublayer controls data flow at the interface between the second and the third layer. The LLC layer transmits the received data flow on the radio connection 170 using error detection and correction levels required by the quality standard of the offered service. An implementation, in which a radio network sublayer to be described below communicates directly with the RLC/MAC sublayer, is also possible.

The third layer, i.e. the network layer, offers the upper levels independence of data transmission and switching techniques by which the connections between terminals are handled. The network layer carries out connection setup, maintenance and release, for instance. In GSM, the network layer is also known as a signalling layer. It has two main functions: message routing and providing a plurality of independent, simultaneous connections between two entities.

In the conventional GSM system, the network layer comprises a connection management sublayer CM, a mobility management sublayer MM and a radio resource management sublayer.

The radio resource management sublayer is responsible for frequency spectrum management and for system reactions to changing radio conditions. In addition, it is responsible for maintaining a high-quality channel, for instance, by attending to channel selection, channel release, possible frequency hopping sequences, power control, time setting, reception of subscriber terminal measurement reports, timing advance control, ciphering settings and handover between cells. Messages of this sublayer are transmitted between the subscriber terminal 150 and the base station controller 102.

The mobility management sublayer MM handles the consequences resulting from the mobility of the subscriber terminal user, which do not directly relate to the operation of the radio resource management sublayer. In a fixed network this sublayer would attend to user authorization verification and connection of the user to the network. In cellular radio networks the sublayer in question thus supports user mobility, registration and management of data resulting from mobility. In addition, the sublayer checks the identity of the subscriber terminal and the identities of permitted services. Messages of this sublayer are transmitted between the subscriber terminal 150 and the mobile services switching centre 132.

The connection management sublayer CM manages all operations associated with circuit-switched call management. These operations are provided by a call management entity, moreover, other services, such as SMS (Short Message Service) are provided by separate entities. The connection management sublayer does not detect user mobility. So in GSM, the operations of the connection management sublayer come almost directly from ISDN (Integrated Services Digital Network) of the fixed network. The call management entity establishes, maintains and releases the calls. It has specific procedures for calls originated by and terminating to the mobile station 150. Also in this sublayer, messages are transmitted between the subscriber terminal 150 and the mobile services switching centre 132.

In UMTS, the TDMA technique employed in the physical layer in GSM is replaced by a broadband CDMA technique (Code Division Multiple Access), a broadband TDMA technique or a broadband combination of the CDMA and TDMA techniques. In this case the GSM radio resource management sublayer cannot be reused in UMTS, but it is replaced by a radio network sublayer RNL providing corresponding services upwards. The radio network sublayer can be divided into RBC (Radio Bearer Control) and RRC (Radio Resource Control) sublayers, but it can also be preserved as a single entity. When preserved as a single entity, it can be called an RRC sublayer. If division into sublayers is applied, the RRC sublayer performs e.g. cell data broadcasting, paging, processing of subscriber terminal 150 measurement results and handovers. In the RBC sublayer, establishment of a logical connection is provided, and then are determined, for instance, the bit rate of the radio bearer, bit error ratio and whether the transmission concerned is packet switched or circuit switched.

The subscriber terminal 150 needs a UAL (UMTS Adaptation Layer) sublayer between the mobility management and radio network sublayers, in which UAL sublayer the primitives of an upper mobility management sublayer are changed into primitives of a lower radio network sublayer. The UAL sublayer enables a plurality of separate mobility management sublayers (e.g. GPRS and GSM mobility management sublayers) to be arranged onto one radio network sublayer.

The only network sublayer processed in the base station system 126 is the radio network sublayer, messages of the connection management and mobility management sublayers are processed transparently, i.e. they are simply transmitted back and forth through specific sublayers. A RANAP sublayer (Radio Access Network Application Part) provides procedures for negotiating and managing both circuit switched and packet switched connections. It corresponds to a BSSAP (Base Station System Application Part) of GSM, the BSSAP comprising BSSMAP (Base Station System Management Part) and DTAP (Direct Transfer Application Part).

The lower layers of the Iu interface 300 can be implemented, for instance, by means of ATM (Asynchronous Transfer Mode) protocols: SAAL/SS7 (Signaling ATM Adaptation Layer/Signaling System Number 7), AAL (ATM Adaptation Layer).

The IWU 190 comprises the RANAP, SAAL/SS7, AAL sublayers and the physical layer corresponding to those of the base station system 126.

The IWU 190 and the mobile services switching centre 132 further comprise a BSSMAP sublayer which is used for transmitting data associated with a particular subscriber terminal 150 and control data relating to the base station system 126 between the IWU 190 and the mobile services switching centre 132.

At the A interface, the first and the second sublayers are implemented by means of MTP and SCCP sublayers (Message Transfer Part, Signaling Connection Control Part). Their structure is simpler than at the air interface 170, since mobility management, for instance, is not needed.

Figure 4:
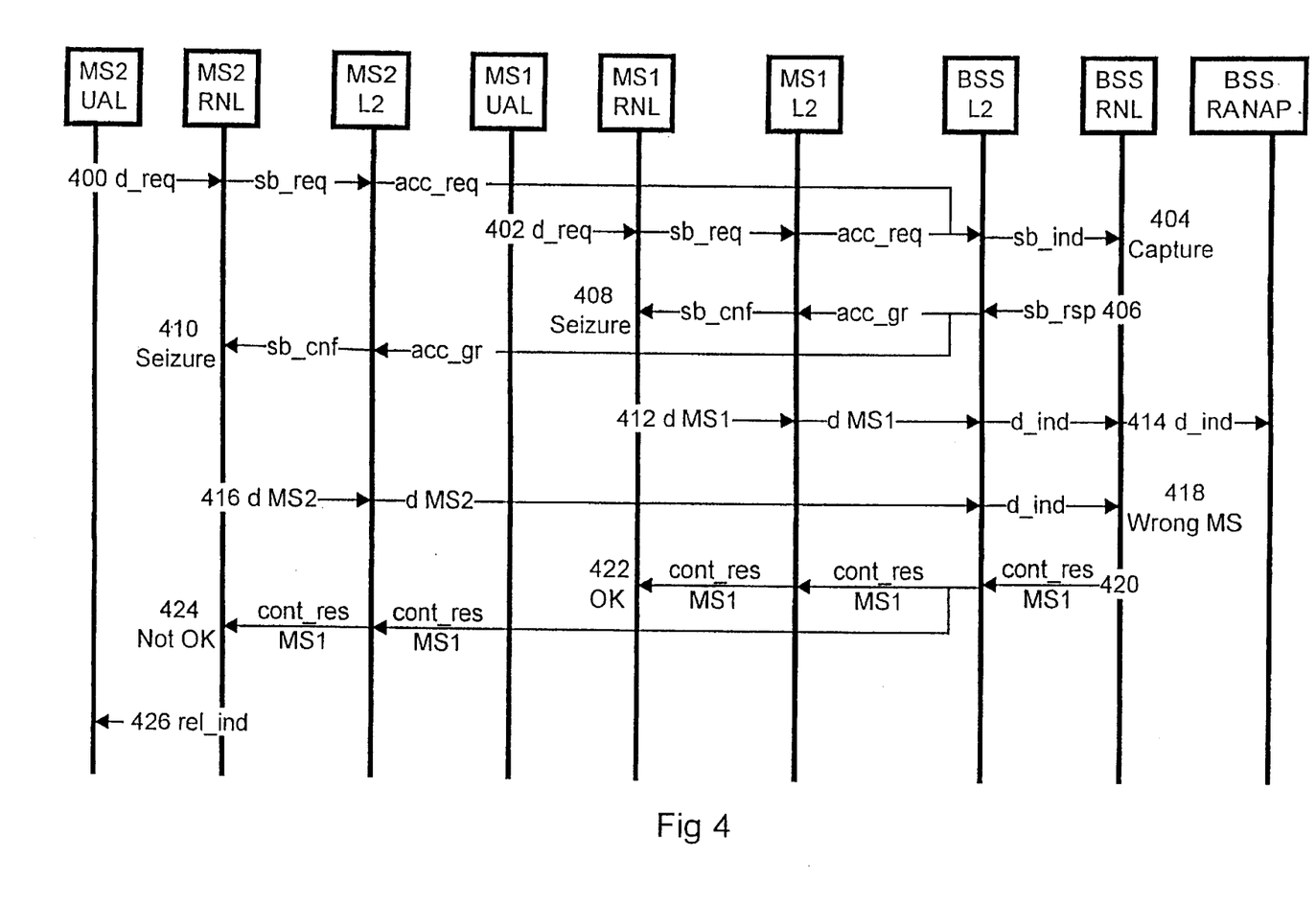
FIG. 4 is a message sequence chart illustrating the contention resolution in accordance with the invention.

As we have now described, with reference to FIGS. 1, 2 and 3, an example of a system with protocols, where the invention can be used, we can proceed to describe the actual method of the invention. FIG. 4 shows as a message sequence chart how two subscriber terminals MS1 and MS2 communicate with a network part 128, in the example particularly with the base station system BSS. The second subscriber terminal MS2 is located farther away from the base station antenna 112 than the first subscriber terminal MS1. For the sake of clarity, FIG. 4 does not show the physical layer.

The second subscriber terminal MS2 decides to establish a connection to the network part 128, for instance, because the user wishes to originate a call, or in order to receive an incoming call. When the user wishes to originate a call, the connection management sublayer transmits a data transmission request to the UAL sublayer MS2 UAL. The UAL sublayer MS2 UAL transmits 400 the data request d_req to a radio network sublayer MS2 RNL. The radio network sublayer MS2 RNL transmits a signalling bearer setup request sb_req to the data link layer MS2 L2 which transmits a random access request acc_req to the data link layer of the base station system BSS L2, which forwards it as a signalling bearer set-up request sb_ind to the radio network sublayer BSS RNL. The signalling bearer is negotiated by using common channels. The random access channel is used in the direction of the network part 128 and the access grant channel is used in the direction of the subscriber terminal 150.

Substantially simultaneously, the first subscriber terminal MS1 starts a similar connection establishment procedure. In the figure, it appears in such a way that the first subscriber terminal's UAL sublayer MS1 UAL transmits 402 a data request d_req to the radio network sublayer MS1 RNL. The radio network sublayer MS1 RNL transmits the signalling bearer set-up message sb_req to the data link layer MS1 L2 which transmits the random access request acc_req to the base station's data link layer BSS L2, which forwards it as a signalling bearer set-up request sb_ind to the radio network sublayer BSS RNL.

It is assumed in the example that the content of the random access request messages sent by both subscriber terminals is by chance exactly the same. As appears from the figure, the random access request messages acc_req of both subscriber terminals MS1, MS2 arrive simultaneously in the base station system 126. It is assumed that there is a significant difference in power between them, whereby one of them can be decoded in the base station system 126. This is known as capture 404. The data link layer BSS L2 forwards sb_ind the captured message to the radio network sublayer BSS RNL.

Then the radio network sublayer of the base station system BSS RNL responds by transmitting 406 a response sb_rsp to the data link layer BSS L2, which in turn transmits an access grant message acc_gra on the access grant channel. Both subscriber terminals MS1, MS2 listen to the access grant channel. The data link layer of the first subscriber terminal MS1 L2 receives the access grant message acc_gra, on the basis of whose content it assumes having reserved 408 a dedicated channel for signalling and forwards a confirmation sb_cnf thereof to the radio network sublayer MS1 RNL. Correspondingly, the second subscriber terminal. MS2 receives the same access grant message acc_gra and assumes on the basis of its content also having reserved 410 the same dedicated channel as the first subscriber terminal MS1 for signalling. Neither subscriber terminal MS1, MS2, nor the base station system BSS, are at this stage aware of the double reservation occurred.

The problem is solved in the favour of the subscriber terminal which first transmits a network layer service request message on the reserved dedicated channel. In the example, the radio network sublayer of the first subscriber terminal transmits 412 data d MS1 with the subscriber terminal identifier through the data link layer MS1 L2 to the base station system. The data link layer of the base station system BSS L2 forwards d_ind the received service request message to the radio network sublayer BSS RNL, which stores the first subscriber terminal identifier MS1 received on said reserved dedicated channel. The service request message itself is forwarded 414 to the RANAP sublayer of the base station system BSS RANAP.

The second subscriber terminal MS2 transmits 416 next a service request message d MS2 with the identifier on the reserved dedicated channel. The radio network layer of the base station system BSS RNL detects that the subscriber terminal identifier MS2 included in the received service request message is different from the stored identifier MS1 sent by the first subscriber terminal on said channel. The radio network sublayer of the base station system BSS RNL destroys the received service request message sent by the second subscriber terminal MS2.

As an identifier the subscriber terminal can use its permanent international identifier or a temporary identifier. In a call destined for the subscriber terminal, the service request message is a paging response message of the radio network layer. In a call originated by the subscriber terminal, the service request message may be one of the following: a location updating request message of the mobility management sublayer, an IMSI detach message of the mobility management sublayer, a service request message of the connection management sublayer, a re-establishment request of the connection management sublayer, a notification response message or an immediate setup message.

The radio network sublayer of the base station system BSS RNL transmits 420 a response message cont_res MS1 on the dedicated channel using the services of the data link layer BSS L2. The response message cont_res MS1 comprises the subscriber terminal identifier MS1 taken from the first service request message received on said channel.

The first subscriber terminal MS1 receives the response message cont_res MS1 and its radio network sublayer MS1 RNL concludes that the dedicated channel reservation succeeded 422, since it finds its own subscriber terminal identifier MS1 in the response message cont_res MS1.

The second subscriber terminal MS2 receives the same response message cont_res MS1 and its radio network sublayer MS2 RNL concludes that its dedicated channel reservation failed 424, since it finds an unknown subscriber terminal identifier MS1 in the response message cont_res MS1, and not its own subscriber terminal identifier MS2.

The radio network sublayer of the second subscriber terminal MS2 RNL transmits 426 a release message rel_ind to upper layers, since the dedicated channel reservation failed. Probably the second subscriber terminal restarts 400 next a dedicated channel reservation operation.

The dedicated channel reservation performed by the first subscriber terminal MS1 succeeded and next it probably receives a reply from the network part to its service request message d MS1.

In the above example, the response message cont_res MS1 transmitted by the radio network sublayer of the base station system BSS RNL was a particular contention resolution message. However, contention can also be resolved in such a way that the message to be sent next by the radio network sublayer of the base station system BSS RNL, the response message cont_res MS1, is a normal network layer message. If this normal network layer message does not include a subscriber terminal identifier MS1, it has to be added thereto. Thus there is no need to send a separate contention resolution message, but a normal network layer message settles the situation.

The invention is preferably implemented by means of software, whereby the invention requires functions in the protocol software in the control unit 124 of the base station controller 102 and in the protocol software in the processor 214 of the subscriber terminal 150 transceiver.

Even though the invention is described above with reference to the example in the attached drawings, it is obvious that it is not restricted thereto, but it can be modified in a variety of ways within the inventive idea disclosed in the attached claims.

What is claimed is:

1. A method of performing contention resolution for dedicated channel reservation of a cellular radio network air interface, which comprises:

a network part and a radio connection from the network part to at least one subscriber terminal;

the network part captures a random access request message transmitted on a random access channel by the subscriber terminal;

the network part transmits an access grant message on an access grant channel to the subscriber terminal;

at least one subscriber terminal receives the access grant message on the access grant channel and on the basis thereof assumes having reserved a dedicated channel;

a network layer of at least one subscriber terminal transmits a network layer service request message, which contains the subscriber terminal identifier, on the dedicated channel to the network layer of the network part, characterized in that a radio network sublayer included in the network layer of the network part transmits on the dedicated channel a response message containing a subscriber terminal identifier to a radio network sublayer of the subscriber terminal;

the radio network sublayer of at least one subscriber terminal compares the subscriber terminal identifier received in the response message on the dedicated channel with its own identifier, and if the identifiers are identical, it comes to a conclusion that its dedicated channel reservation succeeded, and if the identifiers are different, that its dedicated channel reservation failed.

2. The method as claimed in claim 1, characterized in that the response message sent by the radio network sublayer of the network part is a particular contention resolution message.

3. The method as claimed in claim 1, characterized in that the response message sent by the radio network sublayer of the network part is a normal network layer message.

4. A method as claimed in claim 1, characterized in that the service request message is a paging response message of the radio network sublayer.

5. A method as claimed in claim 1, characterized in that the service request message is one of the following: a location updating request message of the mobility management sublayer, an IMSI detach message of the mobility management sublayer, a service request message of the connection management sublayer included in the network layer, a re-establishment request of the connection management sublayer, a notification response message or an immediate set-up message.

6. A network part of the cellular radio network comprising protocol software, which is arranged to capture a random access request message on a random access channel of a subscriber terminal;

to transmit an access grant message on an access grant channel to the subscriber terminal;

to receive a service request message, which contains the subscriber terminal identifier, transmitted on the dedicated channel by at least one subscriber terminal network layer, characterized in that the protocol software is arranged to transmit on the dedicated channel a response message, which contains the subscriber terminal identifier, to the radio network sublayer of the subscriber terminal.

7. The A network part of the cellular radio network as claimed in claim 6, characterized in that the response message sent by the radio network sublayer of the network part is a particular contention resolution message.

8. The network part of the cellular radio network as claimed in claim 6, characterized in that the response message sent by the radio network sublayer of the network part is a normal network layer message.

9. The network part of the cellular radio network as claimed in claim 6, characterized in that the service request message is a paging response message of the radio network sublayer.

10. The method as claimed in claim 6, characterized in that the service request message is one of the following: a location updating request message of the mobility management sublayer included in the network layer, an IMSI detach message of the mobility management sublayer, a service request message of the connection management sublayer included in the network layer, a re-establishment request of the connection management sublayer, a notification response message or an immediate set-up message.

11. A subscriber terminal of the cellular radio network comprising protocol software, which is arranged to transmit a random access request message on a random access channel to a network part;

to receive an access grant message sent by the network part on an access grant channel and to assume on the basis thereof that a dedicated channel is reserved;

to transmit on the dedicated channel a service request message, which contains a subscriber terminal identifier, to a network layer of the network part, characterized in that the protocol software is arranged to receive a response message, which includes the subscriber terminal identifier, transmitted on the dedicated channel by a radio network sublayer included in the network layer of the network part;

to compare the subscriber terminal identifier included in the response message received in the radio network sublayer with its own identifier, and if the identifiers are identical, to conclude that the reservation succeeded, and if the identifiers are different, to conclude that the reservation failed.

12. The subscriber terminal in the cellular radio network as claimed in claim 11, characterized in that the response message sent by the radio network sublayer of the network part is a particular contention resolution message.

13. The subscriber terminal in the cellular radio network as claimed in claim 11, characterized in that the response message sent by the radio network sublayer is a normal network layer message.

14. The subscriber terminal in the cellular radio network as claimed in claim 11, characterized in that the service request message is a paging response message of the radio network sublayer.

15. The subscriber terminal in the cellular radio network as claimed in claim 11, characterized in that the service request message is one of the following: a location updating request message of the mobility management sublayer included in the network layer, an IMSI detach message of the mobility management sublayer, a service request message of the connection management sublayer included in the network layer, a re-establishment request of the connection management sublayer, a notification response message, an immediate set-up message.

* * * * *